US007713122B2

(12) United States Patent
Pacey

(10) Patent No.: US 7,713,122 B2
(45) Date of Patent: May 11, 2010

(54) WAGERING GAME WITH BONUS GAME ELEMENTS DICTATED BY BASIC GAME

(75) Inventor: Larry J. Pacey, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 738 days.

(21) Appl. No.: 11/359,709

(22) Filed: Feb. 22, 2006

(65) Prior Publication Data

US 2006/0189379 A1 Aug. 24, 2006

Related U.S. Application Data

(60) Provisional application No. 60/655,651, filed on Feb. 23, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/25; 463/16; 463/20; 463/30; 463/43

(58) Field of Classification Search .................. 463/16, 463/20, 25, 30, 43
See application file for complete search history.

(56) References Cited

U.S. PATENT DOCUMENTS 4,099,722 A 7/1978 Rodesch et al.
4,200,291 A 4/1980 Hooker
4,636,951 A 1/1987 Harlick
RE34,244 E 5/1993 Hagiwara
5,564,700 A 10/1996 Celona
5,704,835 A 1/1998 Dietz, II
5,720,662 A 2/1998 Holmes, Jr. et al.
5,769,716 A 6/1998 Saffari et al.
5,807,172 A 9/1998 Piechowiak
5,951,397 A 9/1999 Dickinson
5,980,384 A 11/1999 Barrie
6,089,977 A 7/2000 Bennett
6,117,013 A 9/2000 Eiba
6,159,098 A 12/2000 Slomiany et al.
6,224,484 B1 5/2001 Okuda et al.
6,227,971 B1 5/2001 Weiss
6,234,896 B1 5/2001 Walker et al. ................ 463/16

(Continued)

FOREIGN PATENT DOCUMENTS

EP 0 058488 8/1982

(Continued)

*Primary Examiner*—John M Hotaling, II
*Assistant Examiner*—Adetokunbo Torimiro
(74) *Attorney, Agent, or Firm*—Nixon Peabody LLP

(57) ABSTRACT

According to one embodiment of the present invention, a method of conducting a wagering game having a basic game and a secondary game is disclosed. A wager is received from a player to play a basic game. A plurality of bonus objects are provided within the basic game. The bonus objects are capable of being collected in the basic game. A secondary game is initiated and at least one collected bonus object is provided as a player-selectable bonus object within the secondary game. The bonus object may be capable of providing an enhanced payout in the secondary game. A system is further provided for playing the above-described wagering game having a basic game and a secondary game.

23 Claims, 8 Drawing Sheets

U.S. PATENT DOCUMENTS

| | | | |
|---|---|---|---|
| 6,241,607 B1 | 6/2001 | Payne et al. | |
| 6,251,013 B1 | 6/2001 | Bennett | |
| 6,311,976 B1 | 11/2001 | Yoseloff et al. | |
| 6,315,660 B1 | 11/2001 | DeMar et al. | |
| 6,409,602 B1 | 6/2002 | Wilshire et al. | |
| 6,419,579 B1 | 7/2002 | Bennett | |
| 6,494,454 B2 * | 12/2002 | Adams | 273/292 |
| 6,533,273 B2 | 3/2003 | Cole et al. | |
| 6,605,001 B1 | 8/2003 | Tarantino | |
| 6,612,574 B1 | 9/2003 | Cole et al. | |
| 6,612,575 B1 | 9/2003 | Cole et al. | |
| 6,656,047 B1 | 12/2003 | Tarantino et al. | |
| 6,702,671 B2 | 3/2004 | Tarantino | |
| 6,802,073 B1 | 10/2004 | Takahashi et al. | |
| 6,855,054 B2 | 2/2005 | White et al. | |
| 7,011,581 B2 | 3/2006 | Cole et al. | |
| 7,090,579 B2 | 8/2006 | Tarantino | |
| 7,094,147 B2 | 8/2006 | Nakata et al. | |
| 7,192,345 B2 * | 3/2007 | Muir et al. | 463/20 |
| 7,297,058 B2 | 11/2007 | Gomez et al. | |
| 7,513,828 B2 | 4/2009 | Nguyen et al. | |
| 2002/0055381 A1 | 5/2002 | Tarantino | |
| 2002/0077165 A1 | 6/2002 | Bansemer et al. | |
| 2003/0054874 A1 | 3/2003 | Kaminkow | |
| 2003/0057645 A1 | 3/2003 | Baerlocher | |
| 2003/0060267 A1 | 3/2003 | Glavich | |
| 2003/0157981 A1 | 8/2003 | Marks et al. | |
| 2004/0043809 A1 | 3/2004 | Gomez et al. | |
| 2004/0106443 A1 * | 6/2004 | Fiden | 463/16 |
| 2004/0259624 A1 * | 12/2004 | Duhamel | 463/16 |
| 2005/0059459 A1 * | 3/2005 | Dunn et al. | 463/16 |
| 2005/0121850 A1 * | 6/2005 | Pierce et al. | 273/139 |
| 2005/0245309 A1 * | 11/2005 | Englman | 463/20 |
| 2006/0025203 A1 * | 2/2006 | Thomas | 463/20 |
| 2006/0068892 A1 * | 3/2006 | Gomez et al. | 463/20 |
| 2006/0189377 A1 * | 8/2006 | Gomez et al. | 463/20 |

FOREIGN PATENT DOCUMENTS

| | | |
|---|---|---|
| EP | 1 063 622 | 12/2000 |
| GB | 1 454 046 | 10/1976 |
| GB | 2 062 922 | 5/1981 |
| GB | 106 293 | 9/1981 |
| GB | 2 097 160 | 10/1982 |
| GB | 2 106 295 | 4/1983 |
| GB | 2 165 385 | 4/1986 |
| GB | 2170636 | 8/1986 |
| GB | 2 243 236 | 4/1990 |
| GB | 2 372 132 | 2/2001 |
| WO | WO 98/20949 | 5/1998 |
| WO | WO 00/30727 | 6/2000 |

* cited by examiner

WAGERING GAME WITH BONUS GAME ELEMENTS DICTATED BY BASIC GAME

CROSS-REFERENCE TO RELATED APPLICATIONS

This application claims the benefit of priority of U.S. Provisional patent application Ser. No. 60/655,651, filed Feb. 23, 2005, which is hereby incorporated by reference in its entirety.

FIELD OF THE INVENTION

The present invention relates generally to wagering games and, more particularly, to a wagering game having a basic game and a bonus game where at least a portion of the bonus game's elements are dictated by the basic game.

BACKGROUND OF THE INVENTION

Gaming terminals, such as slot machines, video poker machines and the like, have been a cornerstone of the gaming industry for many years. Generally, the popularity of such machines with players is dependent on the likelihood (or perceived likelihood) of winning money at the gaming terminal and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting machines. Shrewd operators constantly strive to employ the most entertaining and exciting machines available, because such machines attract frequent play and hence increase profitability to the operator.

One concept that has been successfully employed to enhance the entertainment value of a game is that of a "secondary" or "bonus" game which may be played in conjunction with a "basic" game. The bonus game may comprise any type of game, either similar to or completely different from the basic game, that is entered upon the occurrence of a selected event or outcome of the basic game. Such a bonus game produces a significantly higher level of player excitement than the basic game, because it provides a greater expectation of winning than the basic game.

The player excitement generated by the bonus game is generally limited to the bonus game session and the possibility of entering such a session, however. Typically, the bonus games are independent from the basic games and as such, the excitement generated by the bonus game during play of the basic game is limited or nil. While bonus game features provide some enhanced excitement relative to other known games, there is a need for developing games where the excitement generated by the bonus game is provided to the player during the play of the basic game as well.

SUMMARY OF THE INVENTION

According to one embodiment of the present invention, a method of conducting a wagering game having a basic game and a secondary game is disclosed. The method comprises the acts of receiving a wager from a player to play a basic game, providing a plurality of bonus objects collectable within the basic game, and initiating the secondary game. The method further comprises the act of providing at least one bonus object collected during play of the basic game as a player-selectable bonus object within the secondary game.

According to another embodiment of the present invention, a method of conducting a wagering game is disclosed. The method comprises the acts of receiving a wager to play a basic wagering game, displaying the basic game, and providing a plurality of collectable bonus objects within the basic game. The method further comprises the acts of collecting one or more of the plurality of collectable bonus objects during play of the basic game and initiating a secondary game. The method further comprises the act of providing the bonus objects collected during play of the basic wagering game as selectable bonus objects within the secondary game. The method further comprises the acts of selecting, via player selection, at least one of the selectable bonus objects and awarding a bonus award based on the selected selectable bonus objects.

According to yet another embodiment of the present invention, a gaming system for playing a wagering game having a basic game and a secondary game is disclosed. The gaming system comprises at least one display, an input device, and one or more controllers. The at least one display displays a plurality of symbols and a plurality of collectable bonus objects that indicate a randomly selected outcome for the basic game. The at least one display also displays the secondary game in response to a predetermined event. The secondary game includes a plurality of selectable bonus objects that include at least one of the collectable bonus objects from the basic game. The input device receives selections of the bonus objects by a player. The one or more controllers are operative to conduct the basic game and the secondary game and to provide an award to the player based on the selections.

According to one embodiment of the present invention, a method of conducting a wagering game having a basic game and a secondary game is disclosed. The method comprises receiving a wager from a player to play a basic game. The method further comprises providing a plurality of bonus objects within the basic game. The bonus objects are capable of being collected in the basic game. The method further comprises initiating the secondary and providing at least one bonus object collected during play of the basic game as a player-selectable bonus object within the secondary game.

According to another embodiment of the present invention, a method of conducting a wagering game is disclosed. The method comprises receiving a wager from a player to play a basic game and displaying the basic wagering game on a display. The method further comprises providing a plurality of bonus objects within the basic game. The bonus objects are capable of being collected. The method further comprises displaying the previously collected bonus objects during play of the basic game and initiating a secondary game after a predetermined event occurs during the basic game. The method further comprises providing the bonus objects collected during play of the basic wagering game as selectable bonus objects within the secondary game. The method further comprises selecting, via player selection, at least one of the selectable bonus objects and awarding a bonus award to the player in the secondary game. The value of the bonus award is determined based on award values for each of the selected selectable bonus objects.

According to yet another embodiment of the present invention, a method of conducting a wagering game is disclosed. The method comprises receiving a wager from a player to play a slots game and displaying the slots game on a display. The slots game includes a plurality of reels that are displayed on the video display. The plurality of reels include a plurality of symbols including a plurality of bonus objects that are capable of being collected. The method further comprises collecting the bonus objects during the slots game, initiating a secondary game during play of the slots game, and providing the bonus objects collected during play of the slots game as selectable bonus objects within the secondary game. The method further comprises selecting, via player selection, at least one of the selectable bonus objects and awarding a bonus award to the player at the conclusion of the secondary game. The value of the bonus award is determined based on award values for each of the selected selectable bonus objects.

According to one embodiment of the present invention, a gaming system for playing a wagering game having a basic game and a secondary game is disclosed. The gaming terminal comprises at least one display, an input device, and a controller. The at least one display displays a plurality of symbols and a plurality of bonus objects that indicate a randomly selected outcome for the basic game. The plurality of bonus objects are adapted to be collected. The randomly selected outcome is selected from a plurality of outcomes. The at least one display displays the secondary game in response to a predetermined event. The secondary game includes a plurality of selectable bonus objects including at least one of the collected bonus objects from the basic game. The input device receives selections of the bonus objects by the player. The controller is operative to conduct the basic game and the secondary game and to provide an award to the player based on the selections made during the secondary game.

The above summary of the present invention is not intended to represent each embodiment, or every aspect, of the present invention. Additional features and benefits of the present invention are apparent from the detailed description, figures, and claims set forth below.

Figure 1:
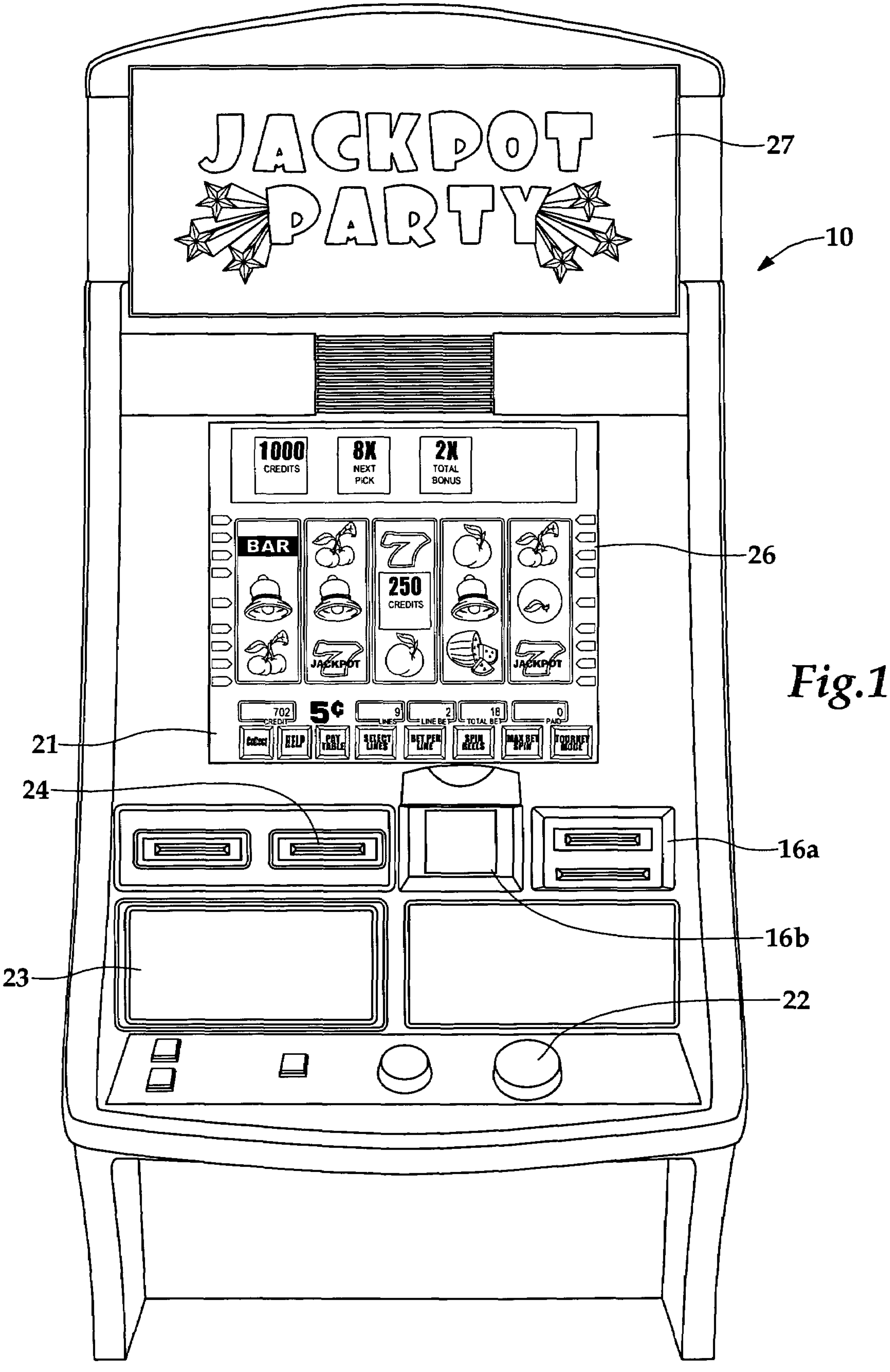
FIG. 1 is a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

The present invention is directed to a gaming terminal and method of playing a wagering game having a basic game and a bonus game where at least a portion of the bonus games elements are dictated by the basic game. Specifically, a portion of the bonus game elements are acquired during standard play of the basic game. These bonus game elements are then used (in some embodiments with additional bonus game elements) within the bonus game. The collected bonus game elements are displayed to a player during play of the basic game until the bonus game event has been triggered.

Turning now to the drawings, FIG. 1 is a perspective view of a gaming terminal 10 according to one embodiment of the present invention. The gaming machine 10 is operable to conduct a wagering game. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video casino games, such as blackjack, slots, keno, poker, etc.

The gaming terminal 10 includes input devices, such as a wager acceptor 16, a touch screen 21, a push-button panel 22, and an information reader 24. For outputs, the gaming terminal 10 includes a payout mechanism 23, a main display 26 for displaying information about a basic wagering game such as video poker and a secondary display 27 for displaying additional information, and an output receptacle coupled to the payout mechanism 23 for providing tokens or coins to the player when the player selects to cash out. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include one or -both of a coin slot acceptor or a currency note acceptor to input value to the gaming terminal 10. Additionally, the wager acceptor 16 may include a card-reading device for reading a card that has a recorded monetary value with which it is associated. The card may also authorize access to a central account, which can transfer money to the gaming terminal 10.

The payout mechanism 23 performs the reverse functions of the wager acceptor 16. For example, the payout mechanism 23 may include a coin dispenser or a note dispenser to output value from gaming terminal 10. Also, the payout mechanism 23 may be adapted to receive a card that authorizes the gaming terminal to transfer credits from the gaming terminal 10 to a central account.

The push button panel 22 is typically offered, in addition to the touch screen 21, to provide players with an option of how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 and the secondary display 27 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Similarly, a touch screen may overlay the secondary display 27. Alternatively, the gaming terminal 10 may have a number of mechanical reels to display the game outcome, as well.

The information reader 24 allows for the identification of a player by reading information, for example, a player's card, indicating the player's true identity. Currently, the identification is used by casinos for rewarding certain players with complimentary services or special offers. For example, a player may be enrolled in the gaming establishment's players' club and may be awarded certain complimentary services as that player collects points in the player's player-tracking account. The player inserts the player's card into the player-identification card reader 24, which allows the casino's computers to register that player's wagering at the gaming terminal 10.

The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved. For example, a player may save collected bonus objects, as will be explained below, for use in a subsequent gaming session. Thus, the player need not sacrifice their earned bonus items by ending their gaming session at a particular gaming terminal.

In some embodiments, the information reader 24 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming terminal so that the player can be recognized using a voice recognition system.

In some embodiments, the gaming terminal 10 includes a radio frequency identification device (RFID) transceiver or receiver so that an RFID transponder held by the player can be used to provide the unique identifier of the player at the gaming terminal 10 without the need to insert a card into the gaming terminal 10. Examples of RFID components that can be used with the present intention are available from Pacific Northwest National Laboratory (under the United States Department of Energy) of Richland, Wash.

Figure 2:
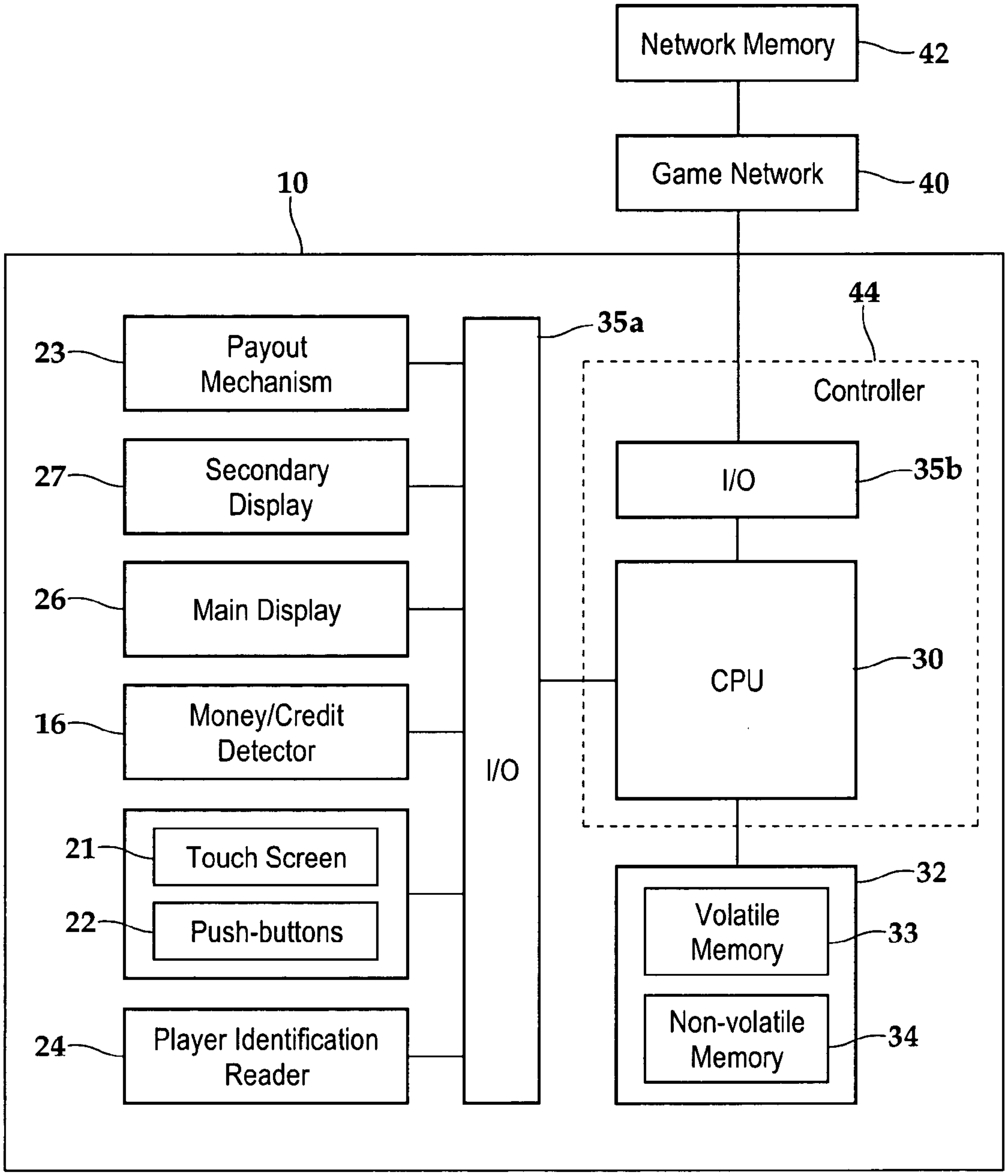
FIG. 2 illustrates a control system that is used in conjunction with the gaming terminal of FIG. 1.

Referring also to FIG. 2, the various components of the gaming terminal 10 are controlled by a central processing unit (CPU) 30 (such as a microprocessor or microcontroller). To provide the gaming functions, the CPU 30 executes a game program. The CPU 30 is also communicatively coupled to or includes a local memory 32. The local memory 32 may comprise a volatile memory 33 (e.g., a random-access memory, "RAM") and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game network 40 having control circuitry and memory devices, wherein a plurality of gaming terminals are coupled to the game network 40. The game network 40 can be the game controller that controls operation of the wagering game as described below. The game network 40 may optionally include a network memory 42 for alternative storage of data. The network memory 42 may be used, for example, in persistent state gaming, where a feature or asset of the player's game may be saved for future use when the player returned for a later gaming session at a different gaming terminal that is also connected to the game network 40. The network memory 42 can include instructions for playing games, such as, progressive jackpots that are contributed to by all or some of the gaming terminals 10 in the game network 40. To provide gaming functions, the CPU 30 or other controller within the gaming network 40 executes one or more game programs stored in a computer readable storage medium, such as the system memory 32 or the network memory 42.

The processor, memory, or both may be remotely located on the game network 40. For example, instead of the CPU 30, the game network 40 may determine the random outcomes for games conducted on the gaming terminal(s) 10. Alternatively, the CPU 30 randomly determines the game outcomes. In some embodiments, the CPU 30 may not be inside the gaming terminal 10. Instead, the CPU 30 may be part of the game network 40 and may be used to control numerous gaming terminals 10.

The gaming terminal 10 often has multiple serial ports, each port dedicated to providing data to a specific host computer system that performs a specific function (e.g., accounting system, player-tracking system, etc.). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the benefits of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40.

As has been discussed, the gaming terminal 10 and/or associated gaming network 40 is capable of executing such wagering games on or through a controller. The controller, as used herein, comprises any combination of hardware, software, and/or firmware that may be disposed or resident inside and/or outside of a gaming terminal 10 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., CPU) is linked to at least one other processing device. The controller, as used herein, may comprise one or more controllers. In one implementation, each gaming terminal 10 comprises, or is connected to, a controller enabling each gaming terminal to transmit and/or receive signals, preferably both, in a peer-to-peer arrangement. In another example, the controller may be adapted to facilitate communication and/or data transfer for one or more gaming terminals 10 in a client/server or centralized arrangement. In the example illustrated in FIG. 2, a controller 44 in the gaming terminal 10 comprises the CPU 30 and the I/O circuit 35*b* (e.g., Network Interface Units) connecting the gaming terminal 10 via a conventional I/O port and communication path (e.g., serial, parallel, IR, RC, 10bT, etc.) to the game network 40, which may include, for example, other gaming terminals connected together in the game network 40.

Figure 3:
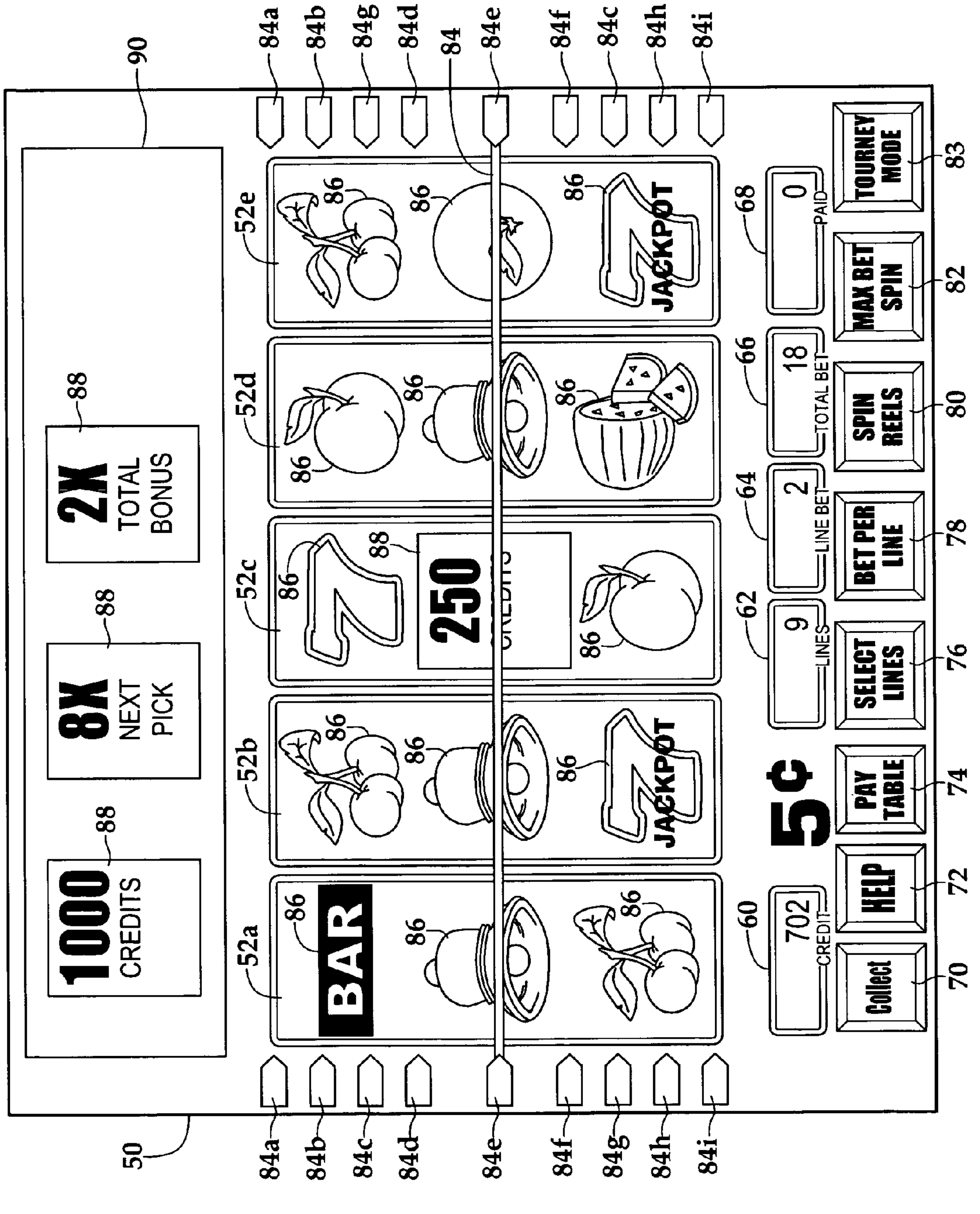
FIG. 3 is an image of a main game screen of a wagering game that is displayed on the gaming terminal of FIG. 1, according to one embodiment of the present invention.

Referring now to FIG. 3, an image of a basic game screen 50 displayed on the main display 26 is illustrated, according to one embodiment of the present invention. A player begins play of a basic wagering game by inserting a wager into the wager input accepter 16 of the gaming terminal 10. A player can select play by either using the touch screen 21 or push-button panel 22. The CPU 30, or the wagering game control network 40 in alternative embodiments, operates to execute a wagering game program causing the main video display 26 to display the wagering game that includes a plurality of visual elements.

The basic game screen 50 may be displayed on the main video display 26 or on a portion thereof. In the illustrated embodiment, the basic game screen 50 is used to display a plurality of simulated, movable reels 52*a-e* with a plurality of symbols 86 and bonus symbols, for example bonus cards 88, displayed thereon. However, the basic game screen 50 may have a plurality of mechanical reels in other embodiments. The reels 52*a-e* are positioned such that the symbols 86 and bonus cards 88 are displayed relative to at least one payline 84. As illustrated, the basic game screen 50 includes a plurality of paylines 84 extending between payline indicators 84*a-i*, yielding a plurality of outcomes for the basic game. The basic game screen 50 may also display a plurality of game session meters and various buttons selectable by a player. The game session meters include a "credit" meter 60 for displaying a number of credits available for play on the machine; a "lines" meter 62 for displaying a number of paylines to be played by a player on the machine; a "line bet" meter 64 for displaying a number of credits wagered (e.g., from 1 to 5 credits) for each of the number of paylines played; a "total bet" meter 66 for displaying a total number of credits wagered for the particular round of wagering; and a "paid" meter 68 for displaying an amount to be awarded based on the results of the particular rounds wager. The user-selectable buttons include a "collect" button 70 to collect the credits remaining in the credits meter 60; a "help" button 72 for viewing instructions on how to play the wagering game; a "pay table" button 74 for viewing a pay table associated with the basic wagering game; a "select lines" button 76 for changing the number of paylines (displayed in the lines meter 62) a player wishes to play; a "bet per line" button 78 for changing the amount of the wager which is displayed in the line bet meter 64; a "spin reels" button 80 for moving the reels 52*a-e*; and a "max bet spin" button 82 for wagering a maximum number of credits and moving the reels 52*a-e* of the basic wagering game. While the gaming terminal 10 allows for these types of player inputs, the present invention does not require them and can be used on gaming terminals having more, less, or different player inputs.

In FIG. 3, the five depicted reels 52*a-e* have a plurality of symbols 86 and bonus cards 88 displayed thereon and at least one activated payline 84 extending from one of the payline indicators 84*a-i* on the left side of the basic game screen 50 to a corresponding one of the payline indicators 84*a-i* on the right side of the screen 50. The plurality of symbols 86 and bonus cards 88 displayed on the plurality of reels 52*a-e* are used to indicate a plurality of possible outcomes along each of the activated paylines 84. The reels 52*a-e* may be either traditional mechanical reels or they may be computer-generated images of reels.

Standard gaming symbols such as "1-BAR" symbols, "2-BAR" symbols, "3-BAR" symbols, "CHERRY" symbols, "SEVEN" symbols, and "BELL" symbols may be depicted on the reels 52*a-e* in some embodiments. In some embodiments, the symbols 86 may represent a particular game theme and may be selected from images corresponding to the particular theme. Further explanation of the composition of the symbols 86 and/or their potential themes is not required to understand the present invention.

A plurality of paylines 84 extend between pairs of payline indicators 84*a-i* such as, for example, the illustrated payline 84 that extends between payline indicators 84*e*. Each active payline 84 indicates a randomly selected outcome, which is the combination of symbols 86 and/or bonus cards 88 on the reels 52*a-e* along the particular payline 84. A player may play multiple paylines 84 by selecting the select-lines button 76 until the desired number of paylines 84 (up to nine in the illustrated embodiment) are displayed. While an embodiment with nine paylines is shown, a gaming terminal 10 with a single payline, or any plurality of paylines will also work with the present invention. Additionally, though an embodiment with five reels is shown, a gaming terminal 10 with any plurality of reels may also be used in accordance with the present invention.

A winning combination occurs when the symbols 86 and/or bonus cards 88 appearing on the reels 52*a-e* along an activated payline 84 correspond to one of the winning symbol combinations listed in a pay table stored in the memory 32 of the gaming terminal 10. The pay table may be displayed on the secondary display 27, the main display 26, or both and be either displayed constantly, intermittently, or upon request by a player (e.g., by selecting the pay-table button 74). Such winning combinations are displayed relative to one or more payline 84. Winning combinations listed in the pay table can include three like-symbols appearing on a payline yielding a first payout, four like-symbols appearing on a payline yielding a second, larger payout, and five like-symbols appearing on a payline yielding a third, even larger payout.

As illustrated in FIG. 3, a winning combination of symbols 86, in this example three bells, is depicted along the payline 84 extending between payline indicators 84*e*. In addition to the winning combination, a bonus card 88 is included within the winning payline 84. In some embodiments of the present invention, the bonus card 88 is earned by the player when the card appears in the same payline as a winning set of symbols 86. In other embodiments, the bonus card 88 is earned by the player whenever it appears along an activated payline. In yet other embodiments, the bonus card 88 acts as a wild-card symbol that can be matched with two or more like symbols 86 to form a winning combination, at which time the bonus card 88 is earned by the player.

Figure 4:
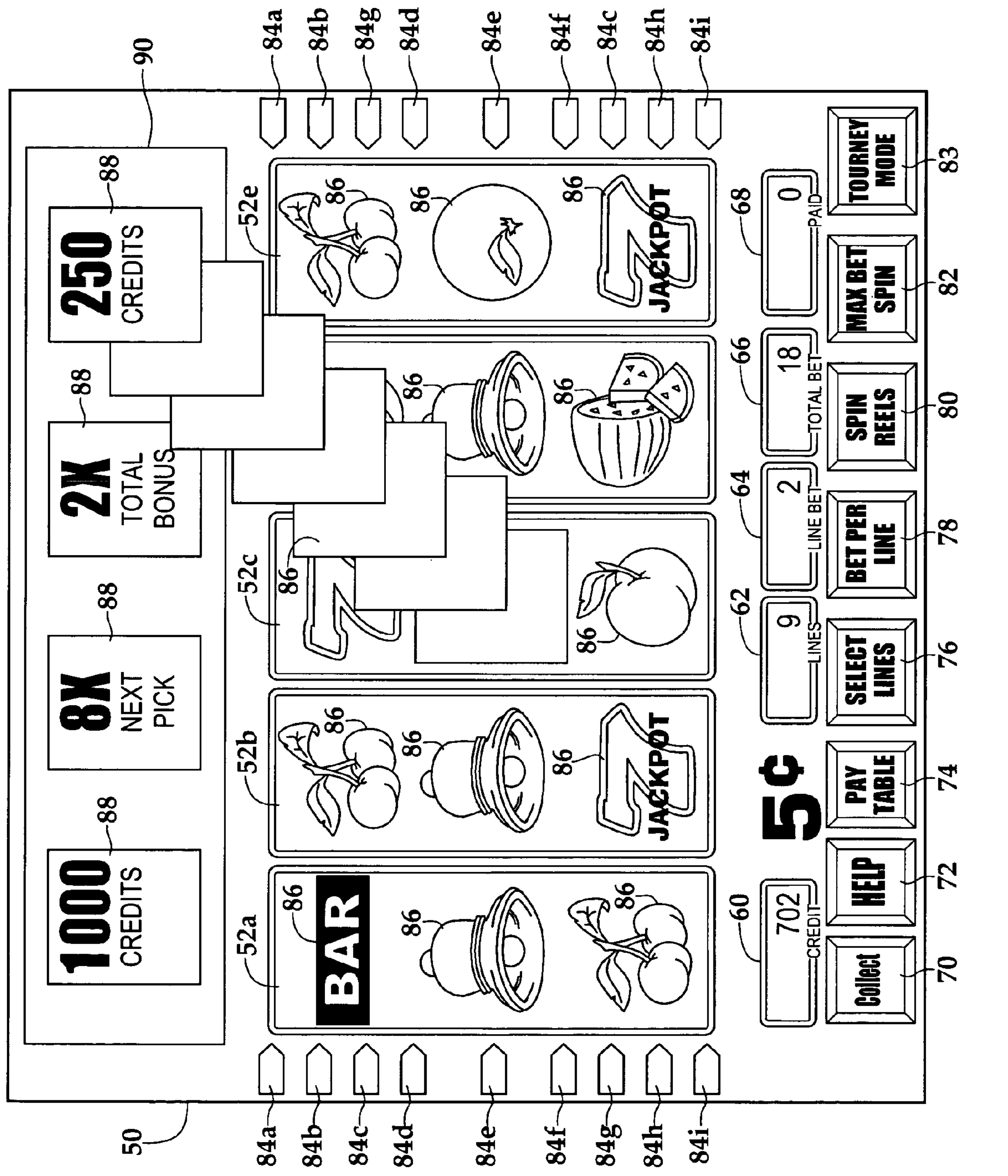
FIG. 4 is an image of the main game screen of FIG. 3 during the collection of a bonus card.

Once a bonus card 88 has been earned by a player, it is displayed in a bonus-card collection box 90. The bonus-card collection box 90 may be displayed within the basic game screen 50 on the main display 26 or, alternatively, may be displayed separately, for example, on the secondary display 27. As illustrated in FIG. 4, the earned bonus card 88 is transferred from the winning payline 84 to the bonus-card collection box 90, according to one embodiment of the present invention. After the bonus card 88 has been collected, the player is able to place another wager and continue play of the basic game until a bonus-game event is triggered, as illustrated in FIG. 5.

Figure 5:
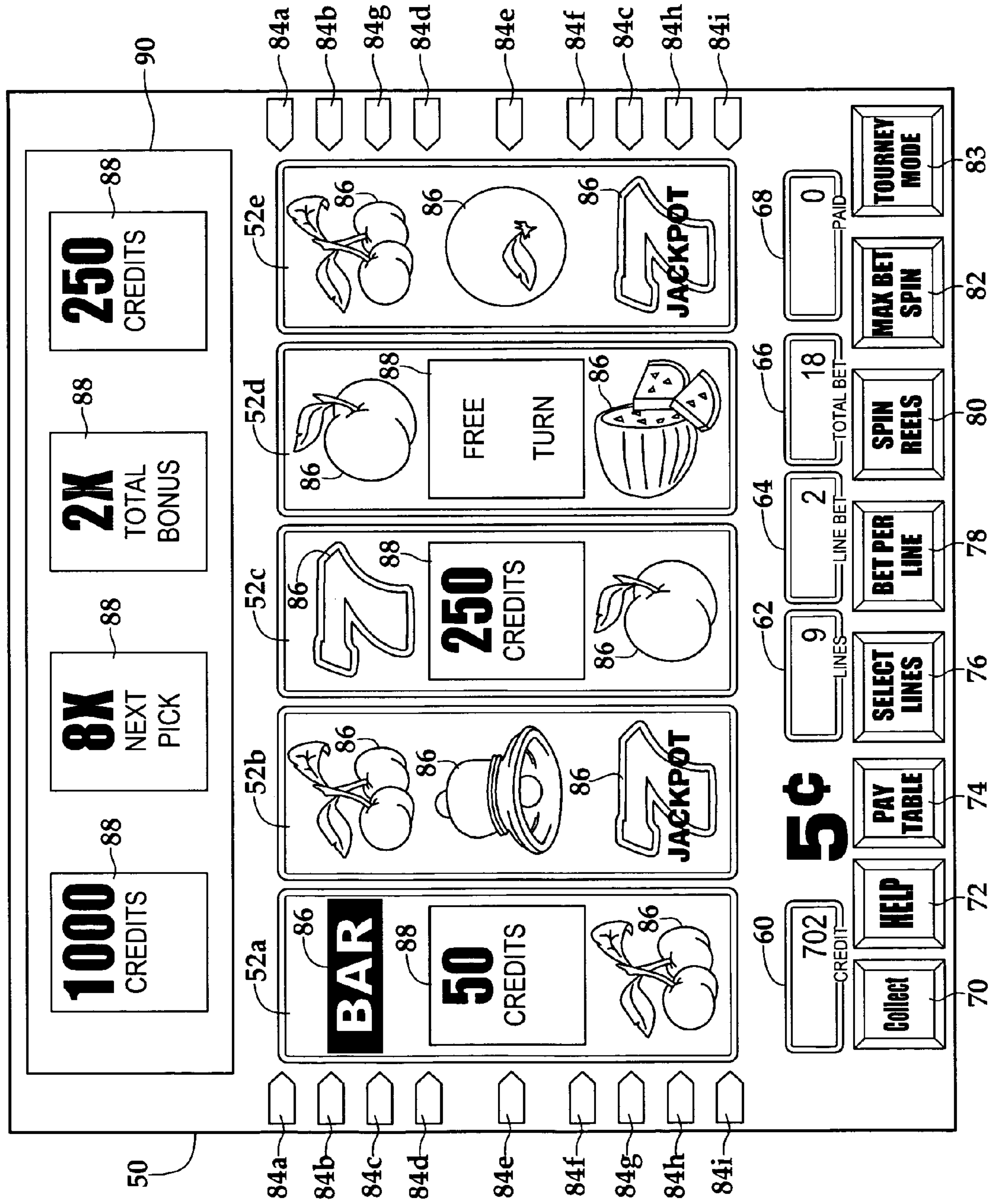
FIG. 5 is an image of the main game screen of FIG. 3 when a bonus triggering combination has been achieved, according to one embodiment of the present invention.

In FIG. 5, three bonus cards 88 are displayed along an activated payline 84 during the play of the basic game. In some embodiments, this initiates or triggers the bonus game accompanying the basic game. The bonus cards 88 along the payline 84 may accompany the player to the bonus game. In alternative embodiments, the bonus game is initiated after a predetermined number of bonus cards 88 have been collected. In other embodiments, the bonus game is initiated when a predetermined set of symbols 86 have been achieved along an activated payline 84. In still other embodiments, the bonus game is initiated after a predetermine period of time, credits wagered, or games played. In some embodiments, the bonus game is randomly initiated.

Figure 6:
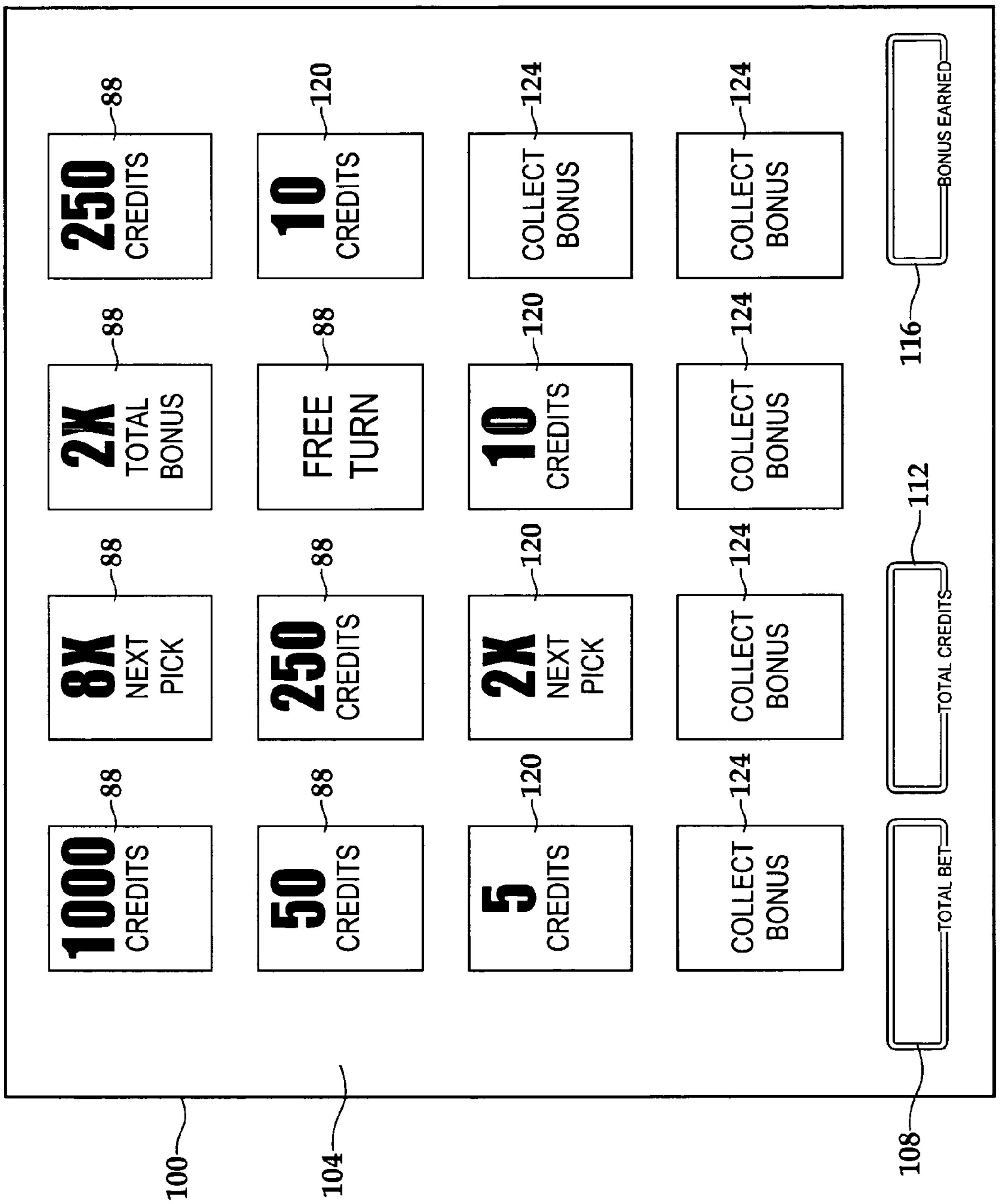
FIG. 6 is an image of a bonus game screen including the collected bonus cards, according to one embodiment of the present invention.
Figure 7:
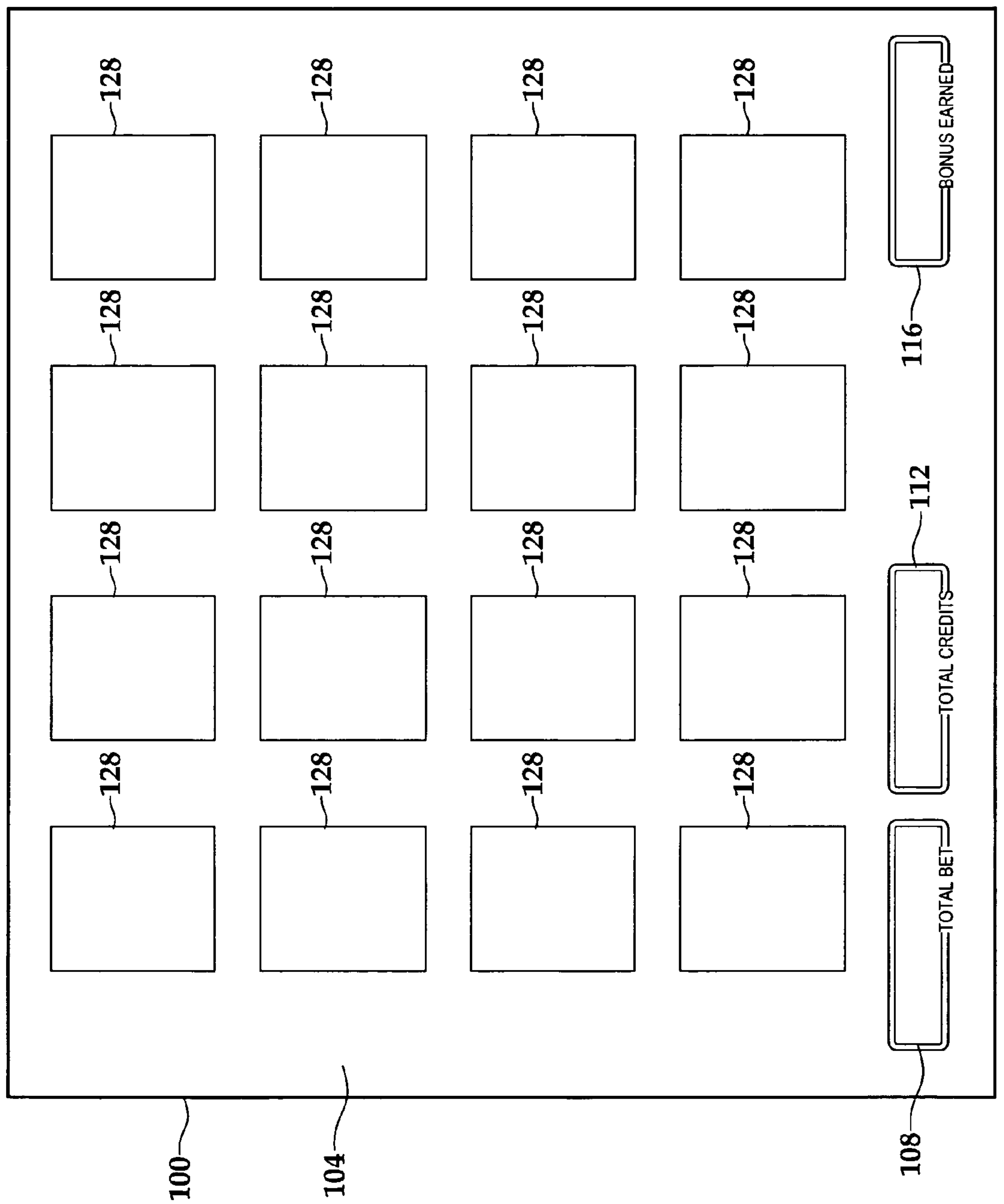
FIG. 7 is an image of the bonus game screen of FIG. 6 after the player-selectable bonus objects have been randomly distributed.
Figure 8:
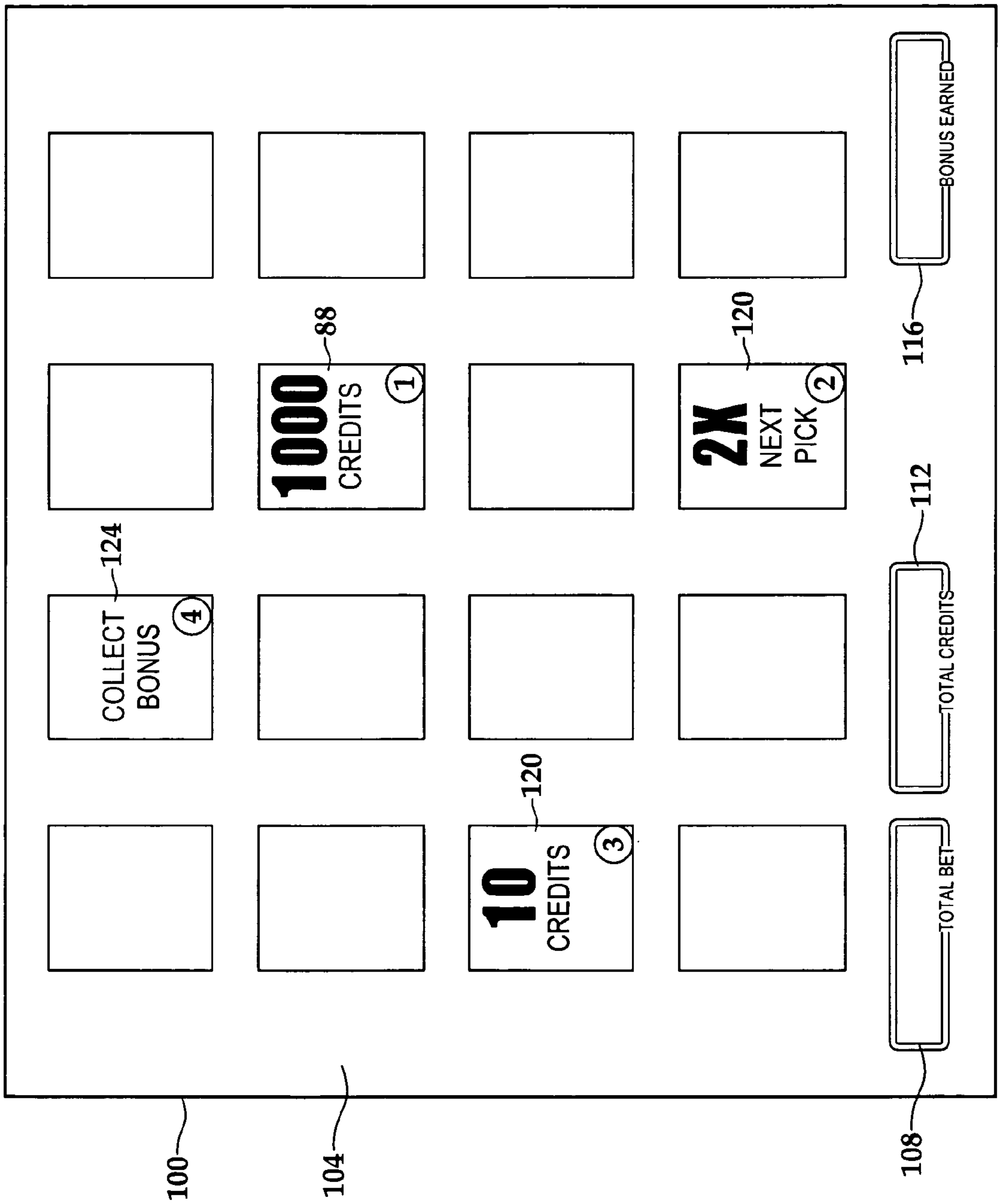
FIG. 8 is an image of the bonus game screen of FIG. 7 after a player has selected a plurality of player-selectable bonus objects, according to one embodiment of the present invention.

Turning now to FIGS. 6-8, the gameplay of the bonus game is illustrated, according to one embodiment of the present invention. The bonus game is displayed on a bonus-game screen 100 that can be displayed on the main display 26, the secondary display 27, or all or portions of both. The bonus-game screen 100 includes: a selection area 104; a "total bet" meter 108 for displaying the players wager; a "total credits" meter 112 for displaying the number of credits that are still available to the player; and a "bonus earned" meter 116 for displaying the bonus earned by the player during the bonus gaming event.

The selection area 104 of the bonus-game screen 100 includes a plurality of bonus objects displayed therein. The bonus objects, as illustrated, include the bonus cards 88 earned during the play of the basic game as the primary bonus objects. A plurality of secondary bonus objects 120 are provided as necessary to equal the desired number of bonus objects from which the player may choose to earn an award. A plurality of end bonus-event objects 124, commonly referred to as "poopers," are displayed within the selection area 104 as well. When a player selects a pooper 124, the award accumulated during the bonus game through that point is totaled and provided to the player as their award for the bonus round. After selecting a pooper 124, the player is returned to the basic game with their bonus award and may continue playing the basic game. However, a free-turn card or similar bonus object may be used to allow the player to continue playing the bonus game after selecting a single pooper 124. In this embodiment, when the player selects a second pooper 124 they are returned to the basic game with their bonus game award.

After displaying the bonus objects 88, 120, 124 to the player, the bonus objects are randomly distributed as player-selectable bonus objects 128, as illustrated in FIG. 7. The player is then prompted to select one of the player-selectable bonus objects 128 by utilizing the touch screen 21, or in some embodiments, the push-button panel 22. The player continues to select player-selectable objects 128 until selecting a pooper 124. As illustrated in FIG. 8, the player's first selection (represented by the numbered circle in the lower right hand corner of the bonus object) was a bonus card 88 awarding the player 1000 Credits. The player is then allowed to select from the remaining player-selectable objects, and in this illustration, the player selected the "2× Next Pick" secondary bonus card 120. The player's third selection was the "10 Credits" secondary bonus card 120, which awards the player 20 credits because of the 2×-Next-Pick secondary bonus card 120 selected immediately prior. The player then selected one of the poopers 124 with their fourth selection and, as such, is awarded the 1020 credits they earned in the bonus game and then returned to the basic game.

As should be apparent from the above, allowing the player to collect bonus cards 88 during play of the basic game provides additional excitement to the player throughout the play of the basic game. The earned bonus cards 88 are displayed to the player throughout the basic game, in some embodiments, and the player becomes ever more excited as the bonus cards 88 continue to be collected. Then, when a bonus gaming event has been initiated, the player is provided the opportunity to earn the various awards provided by the earned bonus cards 88.

In some embodiments, as illustrated, the earned bonus cards 88 (i.e., the primary bonus cards) are of substantially greater value than the secondary bonus cards 120 (that are provided as necessary to meet the desired number of bonus objects from which the player may choose). Thus, the excitement of the player is further increased because, as the player continues to earn bonus cards 88, the potential for a high award in the bonus game increases. In alternative embodiments, however, both the primary bonus cards and secondary bonus cards are randomly selected such that the values of the secondary bonus cards may be the same or greater than the values of the primary bonus cards.

In some embodiments of the present invention, the primary bonus elements form the entirety of the bonus objects along with a plurality of end bonus-event objects. Thus, as more primary bonus elements are collected by the player, the chances of winning an award (and a larger award at that) increase. While the above-described bonus game has been illustrated with respect to a selection area that includes sixteen bonus objects placed in a 4×4 arrangement, it should noted that the bonus game may include any number of bonus objects in any arrangement, symmetrical or asymmetrical, so long as the player is provided a plurality of bonus objects to choose from and at least one of those objects was earned during play of the bonus game.

In some embodiments of the present invention, the player is only allowed to collect a predetermined number of bonus cards 88 that are displayed in collection box 90. If an additional bonus card 88 is earned by the player, the player is provided the option of exchanging the earned bonus card 88 for one of the previously collected bonus cards. Alternatively, the player can decline to substitute the newly earned bonus card 88 and the card is then discarded. Thus, the longer the player plays the basic game, the more desirable the bonus cards become. In addition, in some embodiments, a "super bonus card" may be earned during the basic game that, for example, may double the previously collected bonus cards 88. Thus, a previously collected "500 Credits" bonus card 88 would convert into a "1000 Credits" bonus card 88.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A method of conducting a wagering game having a basic game and a secondary game, comprising:

using an input device to accept a wager from a player to play the basic game;

using a display to display one or more bonus objects within multiple plays of the basic game, the one or more bonus objects being collectable during the multiple plays for subsequent use in the secondary game;

using the display to display an award associated with collected ones of the bonus objects in the basic game;

initiating the secondary game; and using the display to display an array of player-selectable object within the secondary game, the array of player-selectable objects being populated by one or more bonus objects collected during different ones of the multiple plays of the basic game.

2. The method of claim 1, wherein the one or more bonus objects collected within the basic game are primary bonus objects, the primary bonus objects being combined with one or more secondary bonus objects in the secondary game to create the array of player-selectable objects.

3. The method of claim 2, wherein the primary bonus objects have a greater award value than the one or more secondary bonus objects.

4. The method of claim 1, wherein the one or more bonus objects collected within the basic game are primary bonus objects, the primary bonus objects being combined with one or more end bonus-event objects in the secondary game to create the array of player-selectable objects.

5. The method of claim 1, wherein the player-selectable objects include respective award values, the award values being hidden from the player, the award values being revealed only after the player selects one of the player-selectable objects.

6. The method of claim 1, wherein the basic game is a slots game, the slots game including a plurality of reels, the reels including a plurality of symbols, the plurality of symbols including the displayed one or more bonus objects.

7. The method of claim 6, wherein at least one of the bonus objects is a wild card capable of representing one or more of the plurality of symbols displayed on the plurality of reels.

8. The method of claim 6, wherein at least one of the bonus objects are collected in response to the at least one of the bonus objects being displayed as part of a winning symbol combination along an active payline.

9. The method of claim 6, wherein at least one of the bonus objects is collected when the at least one bonus object is displayed within an activated payline.

10. The method of claim 1, wherein the one or more bonus objects collected within the basic game provide a payout in the secondary game in response to being selected by the player.

11. A computer readable storage medium encoded with instructions for directing a processor to perform the method of claim 1.

12. A method of conducting a wagering game, comprising:

receiving a wager to play a basic wagering game;

displaying the basic game;

displaying a plurality of collectable bonus objects within the basic game;

collecting at least two of the plurality of collectable bonus objects during multiple plays of the basic game for subsequent use in a secondary game;

displaying an award associated with the at least two collected bonus objects in the basic game;

initiating the secondary game;

displaying the at least two bonus objects collected during play of the basic wagering game as selectable bonus objects within the secondary game, the at least two bonus objects being collected during at least two plays of the basic game;

selecting, via player selection, at least one of the displayed selectable bonus objects; and awarding a bonus award based on the selected selectable bonus objects.

13. The method of claim 12, wherein the collected bonus objects are primary bonus objects, the primary bonus objects being combined with one or more end bonus-event objects to form the selectable bonus objects within the secondary game.

14. The method of claim 13, wherein the primary bonus objects and the one or more end bonus-event objects are combined with one or more secondary bonus objects to form the selectable bonus objects within the secondary game.

15. The method of claim 14, wherein the primary bonus objects have a greater award value than the one or more secondary bonus objects.

16. A gaming system for playing a wagering game having a basic game and a secondary game, comprising:

at least one display for displaying a plurality of symbols and a plurality of collectable bonus objects that indicate a randomly selected outcome for the basic game, the plurality of collectable bonus objects being collected during the basic game for subsequent use in the secondary game, each of the collectable bonus objects being associated with an award that is displayed in the basic game, the at least one display for displaying the secondary game in response to a predetermined event, the secondary game including an array of selectable bonus objects that is populated by at least two of the collectable bonus objects, each of the at least two collectable bonus objects being collected during different plays of the basic game;

an input device for receiving selections of the selectable bonus objects by a player during the secondary game; and one or more controllers operative to conduct the basic game and the secondary game, and provide an award to the player based on the selections.

17. The gaming system of claim 16, wherein at least one of the one or more controllers is located within the gaming system.

18. The gaming system of claim 16, wherein the provided award is based on the accumulated value of the selectable bonus objects selected during the secondary game.

19. The gaming system of claim 16, wherein the at least one display includes a main display and a secondary display, the plurality of symbols and plurality of collectable bonus objects are displayed in the basic game on the main display and the secondary game is displayed on the secondary display.

20. The gaming system of claim 16, wherein the at least one display displays a collection box, the collection box including at least one of the collectable bonus objects therein.

21. The gaming system of claim 16, wherein the at least two bonus objects collected within the basic game are primary bonus objects, the primary bonus objects being combined with one or more secondary bonus objects in the secondary game to create the array of selectable bonus objects.

22. The gaming system of claim 16, wherein the at least two bonus objects collected within the basic game are primary bonus objects, the primary bonus objects being combined with one or more end bonus-event objects in the secondary game to create the array of selectable bonus objects.

23. The gaming system of claim 16, wherein the provided award is at least partially based on one or more of the awards associated with collected ones of the collectible bonus objects displayed in the basic game.

* * * * *

UNITED STATES PATENT AND TRADEMARK OFFICE

CERTIFICATE OF CORRECTION

PATENT NO. : 7,713,122 B2 
APPLICATION NO. : 11/359709
DATED : May 11, 2010
INVENTOR(S) : Larry J. Pacey It is certified that error appears in the above-identified patent and that said Letters Patent is hereby corrected as shown below:

In claim 1, column 11, line 3, change "object" to --objects--.

Signed and Sealed this

Seventh Day of December, 2010

David J. Kappos
*Director of the United States Patent and Trademark Office*